United States Patent
Reick et al.

(10) Patent No.: US 11,047,460 B2
(45) Date of Patent: Jun. 29, 2021

(54) CONTINUOUSLY VARIABLE POWER-SPLIT TRANSMISSION

(71) Applicant: ZF Friedrichshafen AG, Friedrichshafen (DE)

(72) Inventors: Benedikt Reick, Friedrichshafen (DE); Stefan Beck, Eriskirch (DE); Philipp Rechenbach, Markdorf (DE); Raphael Himmelsbach, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/771,724

(22) PCT Filed: Nov. 16, 2018

(86) PCT No.: PCT/EP2018/081583
§ 371 (c)(1),
(2) Date: Jun. 11, 2020

(87) PCT Pub. No.: WO2019/115147
PCT Pub. Date: Jun. 20, 2019

(65) Prior Publication Data
US 2020/0370630 A1 Nov. 26, 2020

(30) Foreign Application Priority Data
Dec. 13, 2017 (DE) .................. 10 2017 222 596.3

(51) Int. Cl.
*F16H 37/08* (2006.01)
*F16H 3/72* (2006.01)
(52) U.S. Cl.
CPC ........... *F16H 37/084* (2013.01); *F16H 3/728* (2013.01); *F16H 2037/0866* (2013.01)
(58) Field of Classification Search
CPC . F16H 37/084; F16H 3/728; F16H 2037/0866
See application file for complete search history.

(56) References Cited

U.S. PATENT DOCUMENTS

| 5,248,283 A | 9/1993 | Eckhardt et al. |
| 5,643,122 A | 7/1997 | Fredriksen |

(Continued)

FOREIGN PATENT DOCUMENTS

| DE | 41 15 624 A1 | 11/1992 |
| DE | 101 22 823 A1 | 11/2002 |

(Continued)

OTHER PUBLICATIONS

German Search Report Corresponding to 10 2017 222 596.3 dated Nov. 12, 2018.

(Continued)

*Primary Examiner* — Derek D Knight
(74) *Attorney, Agent, or Firm* — Finch & Maloney PLLC; Michael J. Bujold (57) ABSTRACT

A continuously variable power-split transmission having a planetary gear mechanism arrangement. The planetary gear mechanism arrangement has three planetary gear sets, an input shaft and three output shafts. Furthermore, the transmission has a change-speed gearbox connected to the output shafts, a reverse gear mechanism and a variator. Each of the three planetary gear sets is assigned a respective output shaft. The input shaft is operatively connected in each of the three planetary gear sets via a respective gearwheel pairing to a respective output shaft. The transmission can be shifted by the change-speed gearbox and the reverse gear mechanism into at least eight driving ranges. The variator varies a transmission ratio of the transmission within the driving ranges in a continuously variable manner. The variator is continuously operatively connected to a single one of the three planetary gear sets.

16 Claims, 10 Drawing Sheets

(56) References Cited

U.S. PATENT DOCUMENTS

| | | | |
|---|---|---|---|
| 8,696,509 B2* | 4/2014 | Panizzolo | F16H 47/04 |
| | | | 475/218 |
| 8,777,790 B2* | 7/2014 | Grad | B60K 6/48 |
| | | | 475/5 |
| 9,285,015 B2 | 3/2016 | Akerblom et al. | |
| 2012/0225746 A1 | 9/2012 | Hiraoka et al. | |
| 2019/0242460 A1* | 8/2019 | Morrow | B60K 6/445 |

FOREIGN PATENT DOCUMENTS

| | | |
|---|---|---|
| DE | 10 2010 003 941 A1 | 10/2011 |
| DE | 10 2016 204 727 A1 | 9/2017 |
| EP | 0 716 248 A1 | 6/1996 |
| WO | 2013/095213 A1 | 6/2013 |

OTHER PUBLICATIONS

International Search Report Corresponding to PCT/EP2018/081583 dated Feb. 5, 2019.
Written Opinion Corresponding to PCT/EP2018/081583 dated Feb. 5, 2019.

* cited by examiner

| FB | S41 | S42 | S22 | S21 | S32 | S12 | S31 | S11 |
|---|---|---|---|---|---|---|---|---|
| 1 | X |  | X |  | X |  |  |  |
| 2 | X |  |  | X | X |  |  |  |
| 3 | X |  |  | X |  | X |  |  |
| 4 | X |  |  | X |  |  | X |  |
| 5 | X |  |  | X |  |  |  | X |
| 6 |  | X | X |  | X |  |  |  |
| 7 |  | X |  | X | X |  |  |  |
| 8 |  | X |  | X |  | X |  |  |
| 9 |  | X |  | X |  |  | X |  |
| 10 |  | X |  | X |  |  |  | X |

Fig. 10

| FB | S41 | S42 | S22 | S21 | S32 | S12 | S31 |
|---|---|---|---|---|---|---|---|
| 1 | X |  | X |  | X |  |  |
| 2 | X |  |  | X | X |  |  |
| 3 | X |  |  | X |  | X |  |
| 4 | X |  |  | X |  |  | X |
| 5 |  | X | X |  | X |  |  |
| 6 |  | X |  | X | X |  |  |
| 7 |  | X |  | X |  | X |  |
| 8 |  | X |  | X |  |  | X |

Fig. 11

| FB | S22 | S21 | S32 | S12 | S31 | S51 | S52 |
|---|---|---|---|---|---|---|---|
| 1 | X |  | X |  |  | X |  |
| 2 |  | X | X |  |  | X |  |
| 3 |  | X |  | X |  | X |  |
| 4 |  | X |  |  | X | X |  |
| 5 | X |  | X |  |  |  | X |
| 6 |  | X | X |  |  |  | X |
| 7 |  | X |  | X |  |  | X |
| 8 |  | X |  |  | X |  | X |

Fig. 12

CONTINUOUSLY VARIABLE POWER-SPLIT TRANSMISSION

This application is a National Stage completion of PCT/EP2018/081583 filed Nov. 16, 2018, which claims priority from German patent application serial no. 10 2017 222 596.3 filed Dec. 13, 2017.

FIELD OF THE INVENTION

The present invention relates to a continuously variable power-split transmission for a working machine. More specifically, the present invention relates to a continuously variable power-split transmission having a planetary gear mechanism arrangement, a change-speed gearbox and a variator.

BACKGROUND OF THE INVENTION

Working machines, such as for example construction or agricultural machines, are increasingly configured with continuously variable power-split transmissions. In agricultural engineering, such continuously variable power-split transmissions are frequently hydrostatic power-split transmission. The power-split of such transmission systems significantly influences the efficiency curve of current continuously variable power-split transmissions, so-called continuously-variable transmissions. Generally, the greatest efficiency is achieved in transmission ratios when the power to be supplied is provided in a high proportion via a so-called mechanical power path. This mechanical power path merely comprises rotatable shafts and gearwheel pairings. In contrast thereto, the transmission efficiency is generally lower when the power to be supplied is provided in a higher proportion via a power path in which the overall transmission ratio is continuously variable. This fact has a direct influence on the system efficiency curve of a drive train which is designed with a continuously variable power-split transmission and thus also on a drive train management of the transmission which is optimal in terms of consumption.

Continuously variable power-split transmissions provide the user with significant added value in working machines. Combined with a corresponding driving strategy, the performance, the comfort and the fuel consumption of working machines are able to be optimized via the CVT transmission. The continuously variable automatic adjustment of the transmission ratio additionally permits the driver to concentrate fully on the working process. Efficiency, productivity and process quality of the working processes are significantly improved thereby.

As a result of the system, during operation the continuously variable hydrostatic-mechanical power-split transmission provides, via the hydrostatic power path, a reduced level of transmission efficiency compared to a purely mechanical transmission. Tests have shown, however, that by the continuous variation of the transmission ratio and the use of elaborate control strategies, the overall efficiency of a drive train of a working machine may be improved.

In principle, there is the possibility of designing the continuously variable power-split drive systems to be input-coupled, output-coupled, or in a so-called compound configuration. Each of these configurations provides individual advantages and disadvantages. Transmissions which comprise combinations of the last-mentioned configurations permit a very wide range of transmission ratios, with at the same time low power over the variable power path. Moreover, continuously variable power-split transmissions permit a plurality of different driving functions. Thus it is possible to operate a working machine in the so-called powered-zero operating state. In this case, a working machine may be operated at a standstill of the vehicle, without an additional separating element between the working machine and an output of the working machine, at a speed of greater than zero. In the full load range of the working machine, by the use of a continuously variable power-split transmission the maximum engine power may be provided over a wide vehicle speed range.

SUMMARY OF THE INVENTION

It is the object of the invention to provide an improved continuously variable power-split transmission in which a reactive power is reduced or even avoided.

The object is achieved by a continuously variable power-split transmission as recited in the independent claim(s). Advantageous developments form the subject matter of the dependent claims.

Disclosed is a continuously variable power-split transmission having a planetary gear mechanism arrangement. The planetary gear mechanism arrangement has three planetary gear sets, an input shaft and three output shafts. The transmission also has a change-speed gearbox which is connected to the output shafts, a reverse gear mechanism and a variator. Each of the three planetary gear sets is assigned in each case one output shaft. The input shaft is operatively connected in each of the three planetary gear sets via in each case one gearwheel pairing to in each case one output shaft. The transmission can be shifted with the use of the change-speed gearbox and the reverse gear mechanism into at least eight driving ranges. The transmission is able to be shifted into ten driving ranges. The variator is set up to vary a transmission ratio of the transmission within the driving ranges in each case in a continuously variable manner. The variator is operatively connected continuously to a single planetary gear set of the three planetary gear sets. The planetary gear sets may be configured as a simple minus planetary gear mechanism. For use in an agricultural machine it is essential that the driving ranges in a first direction of travel, as well as virtually the same driving ranges in the opposing direction of travel, are possible.

By means of the above-described transmission, it is always possible to avoid a reactive power in the system. It is possible to implement an output-coupled starting gear in which power is provided exclusively via the variator and transmitted by the transmission. Moreover, no shifting elements are provided within the interconnected planetary gear sets, whereby the complexity of the planetary gear mechanism arrangement is reduced.

The variator may have two energy converters which are connected together and which in each case have one output shaft, which are connected continuously to the planetary gear set via one or more spur gear stages. A simple and reliable configuration is achieved by the inseparable coupling of the energy converter to the planetary gear set. Moreover, losses in the power transmission between the variator and the planetary gear set are reduced. The energy converters may be hydraulic or electric energy converters. Both energy converters form the variator.

The energy converters may be electric machines, in each case with a power electronics unit. In this manner, an electrical continuously variable power-split transmission is provided which has an increased transmission efficiency. Furthermore, additional functions such as electric gears and hybrid driving may be implemented by this transmission. For example, a driving range may be provided in which the power is transmitted purely electrically. Such a driving range is particularly suitable as a starting range.

The energy converters may provide electric power for a consumer via an intermediate circuit. Optionally, a battery may be provided for storing the electric power. Accordingly, electric power which is provided for additional functions may be drawn from the transmission.

In the first planetary gear set of the three planetary gear sets, the input shaft may be connected to a first planetary arrangement. A first output shaft may be connected to a first ring gear. A connecting shaft may be connected to a first sun gear. In a second planetary gear set of the three planetary gear sets, the input shaft may be connected to a second ring gear. A second output shaft may be connected to a second planetary arrangement and the connecting shaft may be connected to a second sun gear. In a third planetary gear set of the three planetary gear sets, the input shaft may be connected to a third planetary arrangement. The connecting shaft may be connected to a third ring gear and a third output shaft may be connected to a third sun gear.

The third ring gear and the third output shaft may be operatively connected continuously to the variator. The first planetary gear set, the second planetary gear set and the third planetary gear set may be arranged in this sequence in the input shaft direction.

The third ring gear may be in engagement with a fixed gear on an output shaft of a first energy converter of the variator via an external toothing provided on said third ring gear. The third output shaft may be operatively connected to an output shaft of a second energy converter of the variator via two spur gear stages. In this manner, the energy converters are connected to the third planetary gear set with the same effect. An additional pre-gear ratio may be provided in order to reduce a torque load of the energy converters, whereby these energy converters may be implemented in a smaller and more cost-effective design.

The three planetary gear sets may have identical gear ratios. In particular, the planetary gear sets of the planetary gear mechanism arrangement may have the same stationary gear ratio.

The change-speed gearbox may be a spur gear mechanism. For producing the driving ranges, three gears which are operatively connected continuously to the output shafts of the planetary gear mechanism arrangement may be selectively brought into an operative connection with an output shaft of the change-speed gearbox via gearwheel pairings which may be engaged and disengaged. The complexity of the transmission is further reduced by the design as a spur gear transmission.

The change-speed gearbox may have a first input shaft with a fixed gear and an idler gear which is connectable fixedly in terms of rotation to the first input shaft via a shifting element. The change-speed gearbox may also have a second input shaft which is coaxial to the first input shaft. The second input shaft may have four idler gears which are connectable fixedly in terms of rotation to the second input shaft via shifting elements. The output shaft may have three fixed gears, one thereof being able to be in engagement with the idler gear of the first input shaft and two thereof being able to be in engagement with the idler gears of the second input shaft. The input shafts and the output shaft may be configured as solid shafts. In this manner, the complexity is reduced.

A further idler gear of the four idler gears of the second input shaft may be in engagement with a fixed gear of the third output shaft of the planetary gear mechanism arrangement. A further idler gear may be in engagement with a fixed gear of the second output shaft of the planetary gear mechanism arrangement.

The first input shaft may have a further idler gear which is connectable fixedly in terms of rotation to the first input shaft via a shifting element. The output shaft may have a further fixed gear which is in engagement with the idler gear.

The actuation of the shifting elements may be carried out hydraulically, pneumatically or electrically. The shifting elements may be designed as load shifting elements, such a friction clutches, or as positive shifting elements, such as dog clutches.

The output shaft of the change-speed gearbox may be a hollow shaft which is arranged coaxially to the input shaft of the planetary gear mechanism arrangement.

The continuously variable power-split transmission may have a reverse gear mechanism. This reverse gear mechanism may be designed such that for implementing different rotational directions of the transmission output shaft, the input shaft of the planetary gear mechanism arrangement may be brought into an operative connection with the transmission input shaft via the reverse gear mechanism. For example, the reverse gear mechanism may have a planetary gear mechanism for reversing the rotational direction. For implementing different rotational directions of the transmission output shaft, the output shaft of the change-speed gearbox may be brought into an operative connection with the transmission output shaft via a reverse gear mechanism.

The continuously variable power-split transmission may have a power take-off shaft. This power take-off shaft may be connected fixedly in terms of rotation to the transmission input shaft. The transmission input shaft may be arranged coaxially to the power take-off shaft. Alternatively or additionally, the transmission output shaft may be arranged offset in parallel to the transmission input shaft and the input shaft.

DETAILED DESCRIPTION OF EMBODIMENTS

Embodiments are described hereinafter with reference to the figures. Elements which are the same or similar are identified in the various figures by the same reference numerals.

Figure 1:
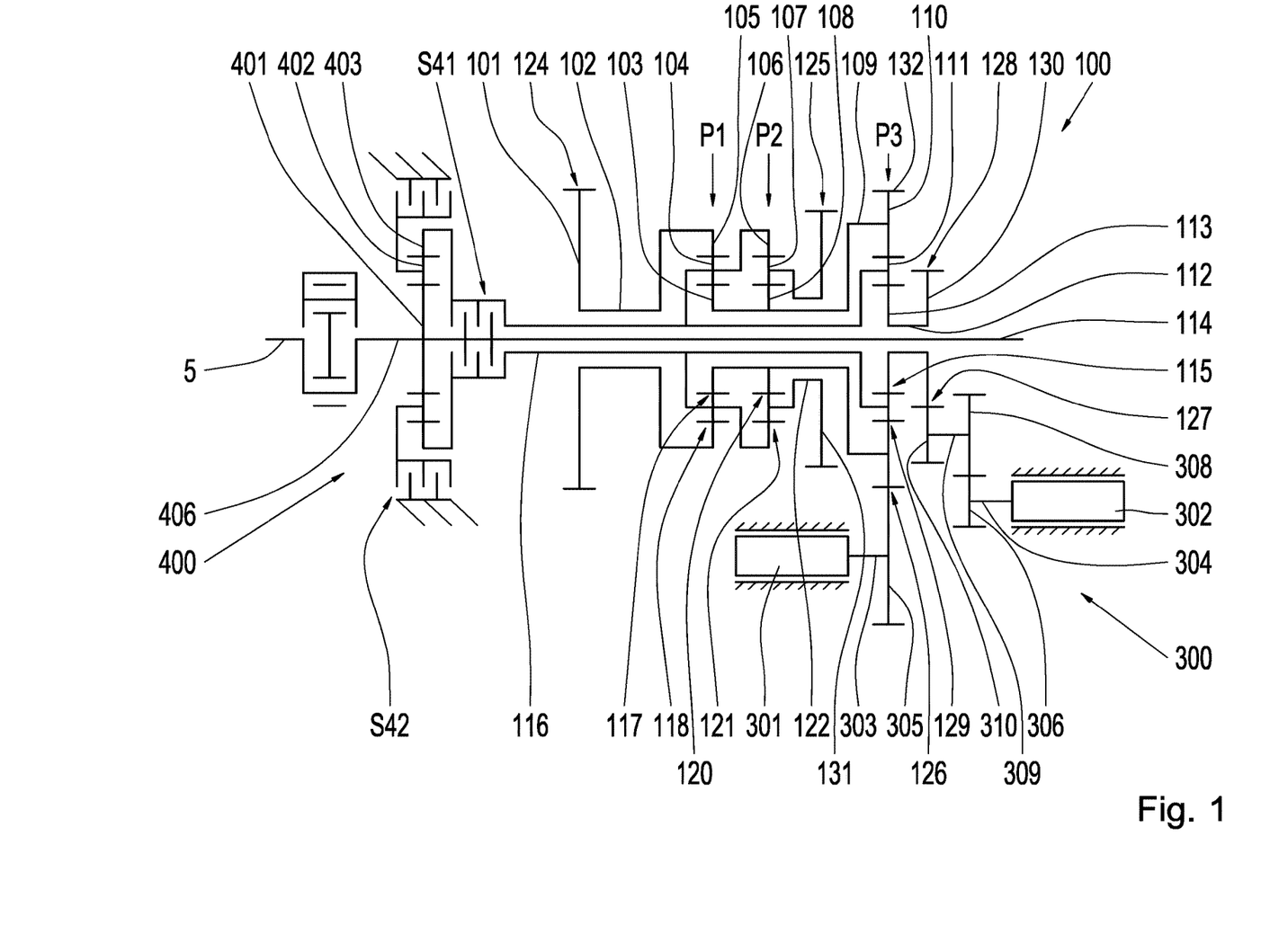
FIG. 1 shows a schematic view of a planetary gear mechanism arrangement in combination with a reverse gear mechanism and a variator for use in a continuously variable power-split transmission according to a first and a second embodiment.

FIG. 1 shows a part of a continuously variable power-split transmission. More specifically, a planetary gear mechanism arrangement 100, a reverse gear mechanism 400 and a variator 300 are shown in FIG. 1.

A transmission input shaft 5 is connected to an input shaft 406 of the reverse gear mechanism 400. The reverse gear mechanism 400 connects the input shaft 406 to an input shaft 116 of the planetary gear mechanism arrangement 100 such that the rotational direction may be reversed. The reverse gear mechanism 400 is configured as a planetary gear mechanism, wherein a sun gear 401 is connected fixedly in terms of rotation to the input shaft 406. A planetary arrangement 402 is in engagement, on the one hand, with the sun gear 401 and in engagement, on the other hand, with a ring gear 403. The ring gear 403 is connected fixedly in terms of rotation to the input shaft 116 of the planetary gear mechanism arrangement 100. The planetary arrangement 402 is connected to a shifting element S42 via a planet carrier. The shifting element S42 is configured as a brake and serves to connect selectively the planet carrier fixedly in terms of rotation to the housing. Via a further shifting element S41, the input shaft 406 is selectively connectable fixedly in terms of rotation to the input shaft 116. The shifting element S41 is configured as a clutch, more specifically as a multi-plate clutch. By this arrangement it is possible by suitable shifting of the shifting elements S41 and S42 to reverse the rotational direction of the input shaft 406 to the input shaft 116. If the shifting element S41 is disengaged, i.e. inactive, and the shifting element S42 is engaged and thus rotation of the planet carrier is prevented, the ring gear 403 rotates in the opposing direction to the rotational direction of the input shaft 406. Conversely, the rotational direction of the input shaft 406 and the rotational direction of the input shaft 116 are the same when the shifting element S41 is engaged and the shifting element S42 is disengaged.

The input shaft 116, which may also be denoted as the output shaft of the reverse gear mechanism 400, is a hollow shaft. The input shaft 406 is a solid shaft. The input shaft 406 and the input shaft 116 are coaxially arranged. The input shaft 406 extends in the axial direction of the reverse gear mechanism 400 entirely through the reverse gear mechanism 400 and also through the planetary gear mechanism arrangement 100. The input shaft 406 at the same time constitutes a so-called power take-off shaft 114. A torque which may be used for driving implements or attachments is available via the power take-off shaft 114.

The planetary gear mechanism arrangement 100 comprises three planetary gear sets P1, P2, P3.

The first planetary gear set P1 has a planetary arrangement 104. A web of the planetary arrangement 104 is connected fixedly in terms of rotation to the input shaft 116. The first planetary gear set P1 has a sun gear 103 which is connected fixedly in terms of rotation to a connecting shaft 109. The connecting shaft 109 is configured as a hollow shaft and is arranged coaxially to the input shaft 116. The first planetary gear set P1 has a ring gear 105 which is connected fixedly in terms of rotation to an output shaft 102. The output shaft 102 further comprises a fixed gear 101 which may also be denoted as the output gear. The fixed gear 101, in the continuously variable power-split transmission, is part of a gearwheel pairing 124 in which the fixed gear 101 is in engagement with a gear of a change-speed gearbox to be described in more detail below. The input shaft 116 is thus directly connected in the first planetary gear set P1 to the output shaft 102 via a gearwheel pairing 118 in which the planetary arrangement 104 is in engagement with the ring gear 105. Moreover, the input shaft 116 is directly connected in the first planetary gear set P1 to the connecting shaft 109, via a gearwheel pairing 117 in which the planetary arrangement 104 is in engagement with the sun gear 103.

The second planetary gear set P2 has a planetary arrangement 107. A web of the planetary arrangement 107 is connected fixedly in terms of rotation to an output shaft 122. The output shaft 122 has a fixed gear 131 which may also be denoted as the output gear. In the continuously variable power-split transmission, the fixed gear 131 is part of a gearwheel pairing 125 in which the fixed gear 131 is in engagement with a gear of the change-speed gearbox described in more detail below. The second planetary gear set P2 has a sun gear 108 which is connected fixedly in terms of rotation to the connecting shaft 109. The second planetary gear set P2 has a ring gear 106 which is connected fixedly in terms of rotation to the input shaft 116. In the arrangement shown, the web of the planetary arrangement 104 is configured on the connection between the ring gear 106 and the input shaft 116. The input shaft 116 is thus directly connected in the second planetary gear set P2 to the output shaft 122, via a gearwheel pairing 121 in which the planetary arrangement 107 is in engagement with the ring gear 106. Moreover, the connecting shaft 109 is directly connected in the second planetary gear set P2 to the output shaft 122, via a gearwheel pairing 120 in which the planetary arrangement 107 is in engagement with the sun gear 108.

The third planetary gear set P3 has a ring gear 110 which is connected fixedly in terms of rotation to the connecting shaft 109. The ring gear 110 has on its outer face an external toothing 132 which is provided for connecting a variator 300. The connection of the variator 300 is described in more detail below.

The third planetary gear set P3 has a planetary arrangement 111, the web thereof being connected fixedly in terms of rotation to the input shaft 116. The third planetary gear set P3 has a sun gear 113 which is connected fixedly in terms of rotation to an output shaft 112. A fixed gear 130 is provided on the output shaft 112. This fixed gear 130 may also be denoted as the output gear. The fixed gear 130 in the continuously variable power-split transmission is a part of a gearwheel pairing 128 in which the fixed gear 130 is in engagement with a gear of a change-speed gearbox to be described in more detail below. The input shaft 116 is thus directly connected in the third planetary gear set P3 to the output shaft 112, via a gearwheel pairing 115 in which the planetary arrangement 111 is in engagement with the sun gear 113. Moreover, the input shaft 116 is connected in the third planetary gear set P3 to the connecting shaft 109, via a gearwheel pairing 123 in which the planetary arrangement 111 is in engagement with the ring gear 110.

The first planetary gear set P1, the second planetary gear set P2 and the third planetary gear set P3 are arranged in this sequence in the longitudinal direction of the planetary gear mechanism arrangement 100, more specifically in the longitudinal direction of the input shaft 116. The first planetary gear set P1 in this case is arranged on the side of the reverse gear mechanism 400.

In the embodiment shown, the variator 300 comprises an energy converter 301 in the form of a first electric machine with a first power electronics unit and a second energy converter 302 in the form of a second electric machine with a second power electronics unit. The energy converter 301 is electrically connected to the energy converter 302.

The first electric machine 301 has an output shaft 303 with a fixed gear 305. The fixed gear 305 is in engagement with the ring gear 110 via the external toothing 132. In other words, the output shaft 303 is operatively connected to the connecting shaft 109 via a gearwheel pairing 126 in which the ring gear 110 of the third planetary gear set P3 is in engagement with the fixed gear 305.

The second electric machine 302 has an output shaft 304 with a fixed gear 306. The fixed gear 306 is in engagement with a fixed gear 308 which is connected fixedly in terms of rotation to a shaft 309. A fixed gear 310, which is in engagement with the fixed gear 130 of the output shaft 112, is also provided fixedly in terms of rotation on the shaft 309. The second electric machine 302 is thus operatively connected via a gearwheel pairing 127 to the output shaft 112, wherein the gearwheel pairing 127 is formed by the fixed gear 130 and the fixed gear 310.

Figure 2:
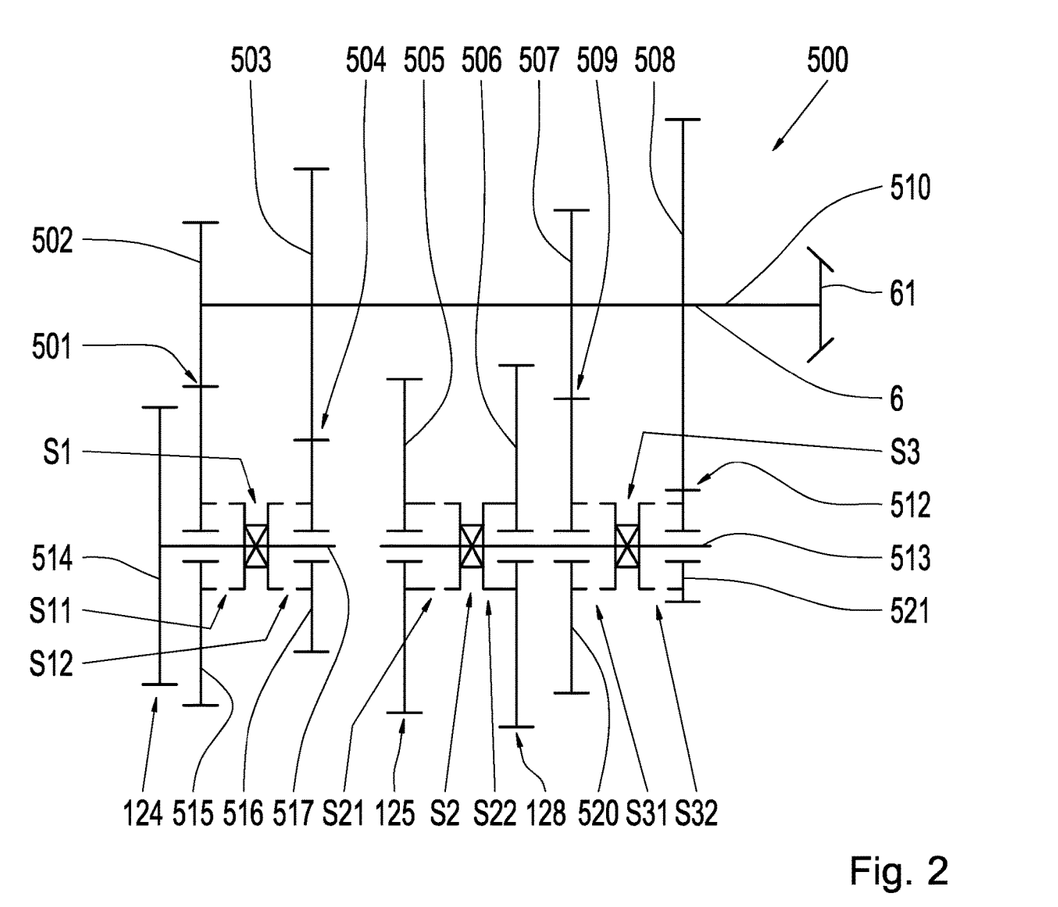
FIG. 2 shows a schematic view of a change-speed gearbox for use in a continuously variable power-split transmission according to the first embodiment.

FIG. 2 shows a further part of a continuously variable power-split transmission. More specifically, a change-speed gearbox 500 is shown in FIG. 2.

The change-speed gearbox 500 has an input shaft 517 and an input shaft 513. A fixed gear 514 is connected fixedly in terms of rotation to the input shaft 517. Moreover, a first idler gear 515 and a second idler gear 516, which are selectively connected fixedly in terms of rotation to the input shaft 517 via a shifting element S1, are arranged on the input shaft 517. In the embodiment shown, the shifting element S1 is configured as a double dog clutch which has a first clutch S11 and a second clutch S12. If the first clutch S11 is engaged, the first idler gear 515 is connected fixedly in terms of rotation to the input shaft 517. If the second clutch S12 is engaged, the second idler gear 516 is connected fixedly in terms of rotation to the input shaft 517. The fixed gear 514 is a part of the gearwheel pairing 124 in the continuously variable power-split transmission. The idler gears 515 and 516 may also be denoted as output gears of the input shaft.

Four idler gears 505, 506, 520, 521 are provided on the input shaft 513, more specifically a first idler gear 505, a second idler gear 506, a third idler gear 520 and a fourth idler gear 521. The first idler gear 505 is part of the gearwheel pairing 125 in the continuously variable power-split transmission. The second idler gear 506 is part of the gearwheel pairing 128 in the continuously variable power-split transmission. The first idler gear 505 and the second idler gear 506 are selectively connectable fixedly in terms of rotation to the input shaft 517 via a shifting element S2. The shifting element S2 in the embodiment shown is configured as a double dog clutch which has a first clutch S21 and a second clutch S22. If the first clutch S21 is engaged, the idler gear 505 is connected fixedly in terms of rotation to the input shaft 513. If the second clutch S22 is engaged, the idler gear 506 is connected fixedly in terms of rotation to the input shaft 513. The third idler gear 520 and the fourth idler gear 521 may also be denoted as output gear wheels of the input shaft 513. The third idler gear 520 and the fourth idler gear 521 are selectively connectable fixedly in terms of rotation to the input shaft 513 via a shifting element S3. The shifting element S3 in the embodiment shown is configured as a double dog clutch which has a first clutch S31 and a second clutch S32. If the first clutch S31 is engaged, the third idler gear 520 is connected fixedly in terms of rotation to the input shaft 513. If the second clutch S32 is engaged, the fourth idler gear 521 is connected fixedly in terms of rotation to the input shaft 513.

The change-speed gearbox 500 further comprises an output shaft 510. A first fixed gear 502, a second fixed gear 503, a third fixed gear 507 and a fourth fixed gear 508 are connected fixedly in terms of rotation to the output shaft 510. The first fixed gear 502 is in engagement with the first idler gear 515 and forms therewith a gearwheel pairing 501.

The second fixed gear 503 is in engagement with the second idler gear 516 and forms therewith a gearwheel pairing 504. The third fixed gear 507 is in engagement with the third idler gear 520 and forms therewith a gearwheel pairing 509. The fourth fixed gear 508 is in engagement with the fourth idler gear 521 and forms therewith a gearwheel pairing 512.

The output shaft 510 at the same time constitutes a transmission output shaft 6 on which an output gear 61 is provided for further power transmission. For example, a crown gear of a rear axle of an agricultural machine, for example of a tractor, may be connected to this output gear 61.

Figure 3:
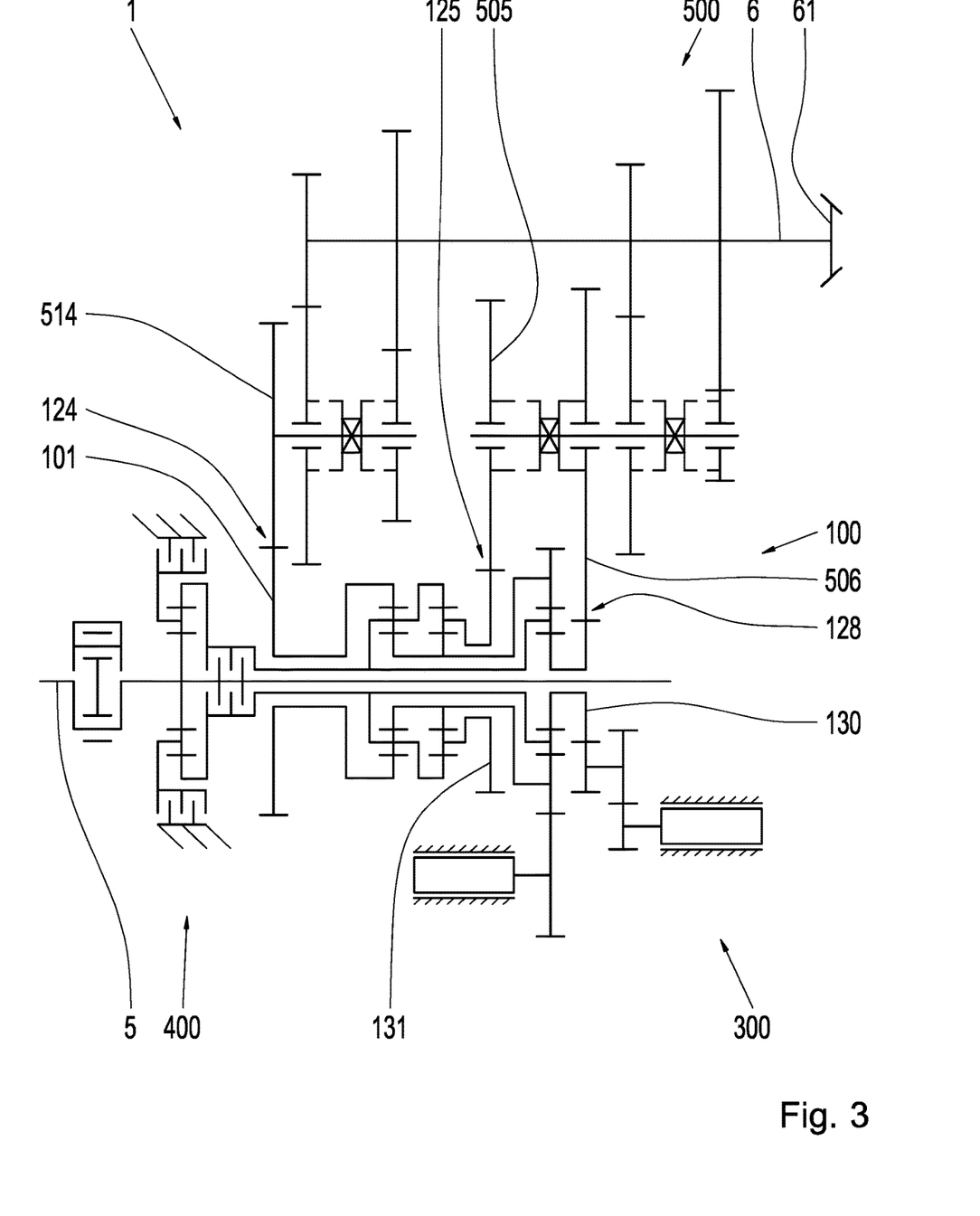
FIG. 3 shows schematically a continuously variable power-split transmission according to the first embodiment.

A combination of the change-speed gearbox 500 shown in FIG. 2 with the arrangement described in FIG. 1 forms a continuously variable power-split transmission 1 according to a first embodiment and is shown in FIG. 3. The fixed gear 101 of the planetary gear mechanism arrangement 100 is in engagement with the fixed gear 514 and forms therewith the gearwheel pairing 124. The fixed gear 131 of the planetary gear mechanism arrangement 100 is in engagement with the first idler gear 505 and forms therewith the gearwheel pairing 125. The fixed gear 130 is in engagement with the second idler gear 506 and forms therewith the gearwheel pairing 128.

Figure 4:
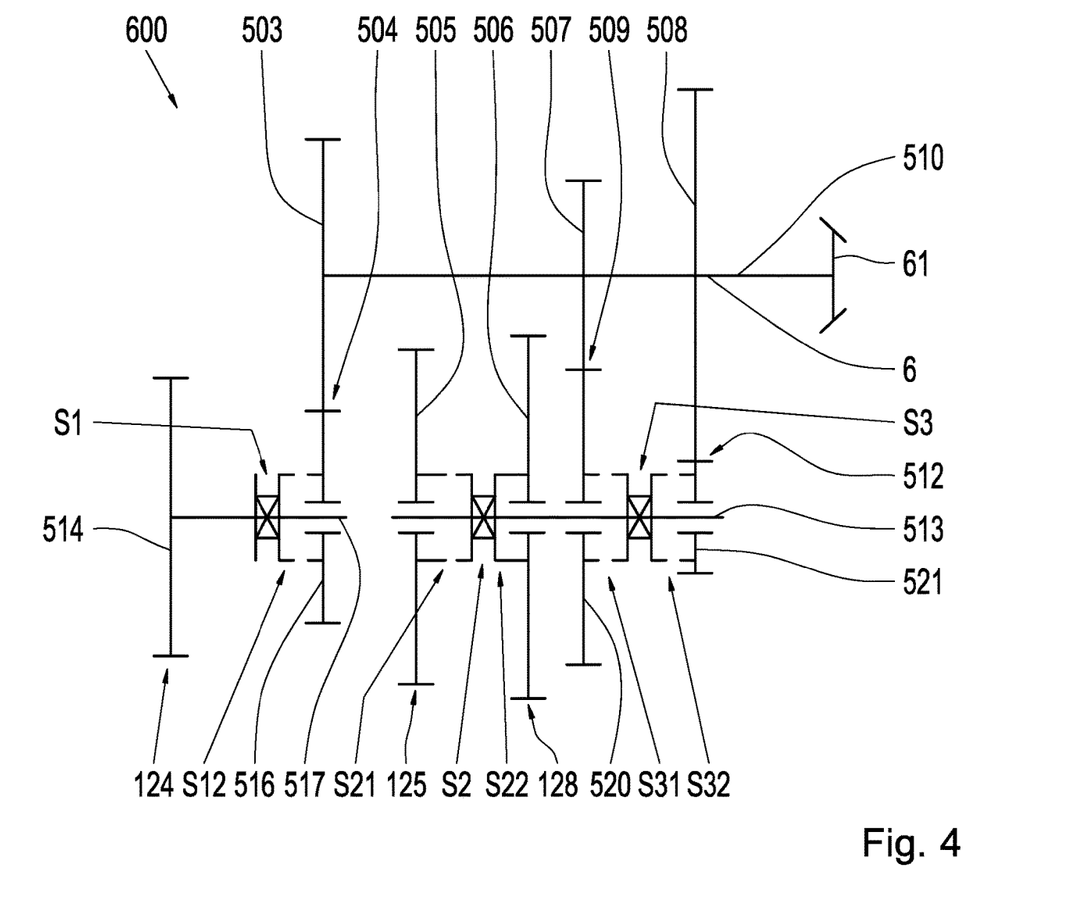
FIG. 4 shows a schematic view of a further change-speed gearbox for use in a continuously variable power-split transmission according to the second embodiment.

A modification of the change-speed gearbox 500 shown in FIG. 2 is shown in FIG. 4. The change-speed gearbox 600 shown in FIG. 4 differs from the change-speed gearbox 500 in that the gearwheel pairing 501 is not present. In other words, the change-speed gearbox 600 merely has a single idler gear 516 rather than the first idler gear 515 and the first fixed gear 502 of the arrangement shown in FIG. 2. Accordingly the first shifting element S1 is merely configured with a simple dog clutch S12 which is able to connect the idler gear 516 fixedly in terms of rotation to the input shaft 517. The other elements of the change-speed gearbox 600 correspond to those of the change-speed gearbox 500 shown in FIG. 2.

Figure 5:
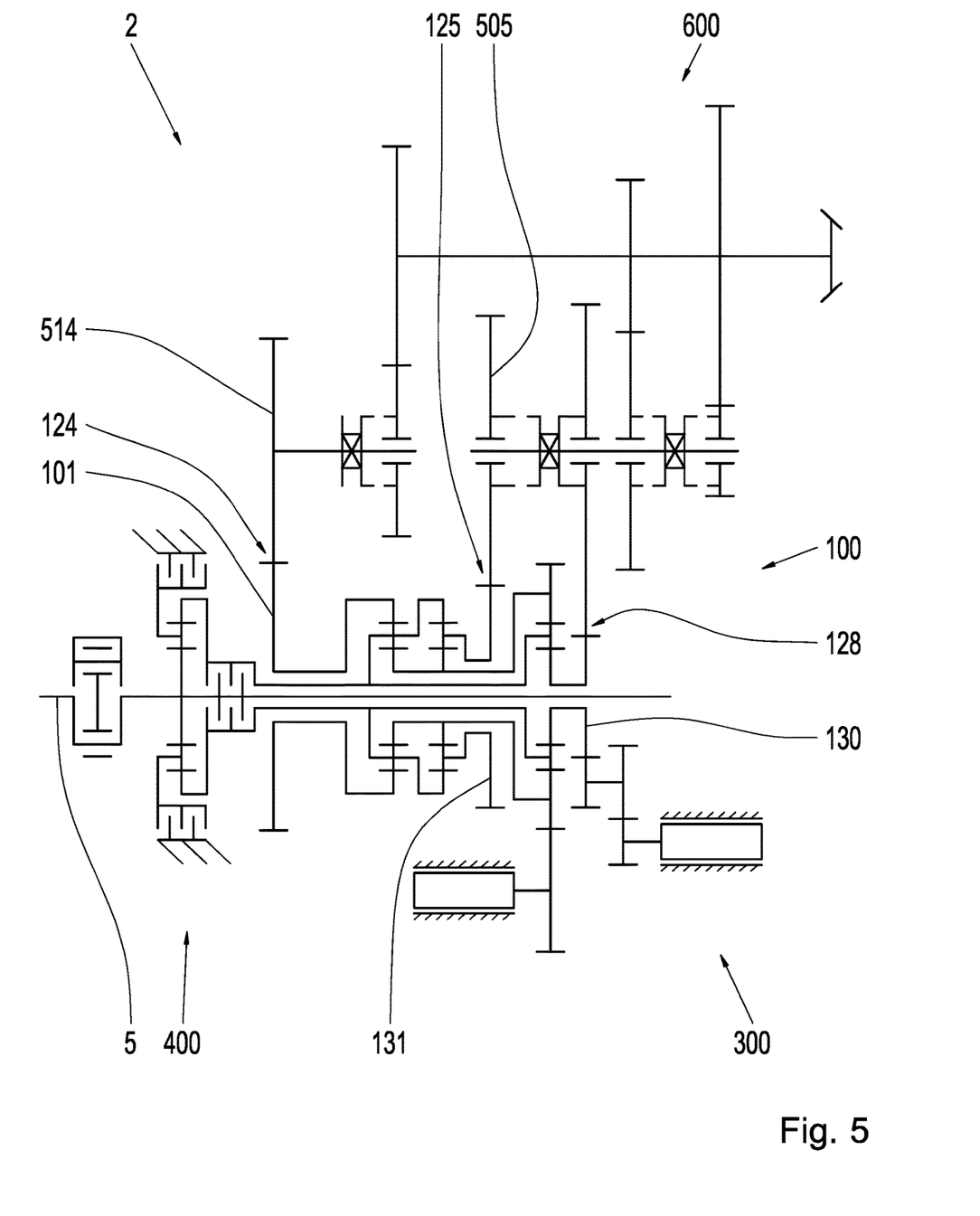
FIG. 5 shows schematically a continuously variable power-split transmission according to the second embodiment.

A combination of the change-speed gearbox 600 shown in FIG. 4 with the arrangement described in FIG. 1 forms a continuously variable power-split transmission 2 according to a second embodiment and is shown in FIG. 5. The fixed gear 101 of the planetary gear mechanism arrangement 100 is in engagement with the fixed gear 514 and forms therewith the gearwheel pairing 124. The fixed gear 131 of the planetary gear mechanism arrangement 100 is in engagement with the first idler gear 505 and forms therewith the gearwheel pairing 125. The fixed gear 130 is in engagement with the second idler gear 506 and forms therewith the gearwheel pairing 128.

Figure 6:
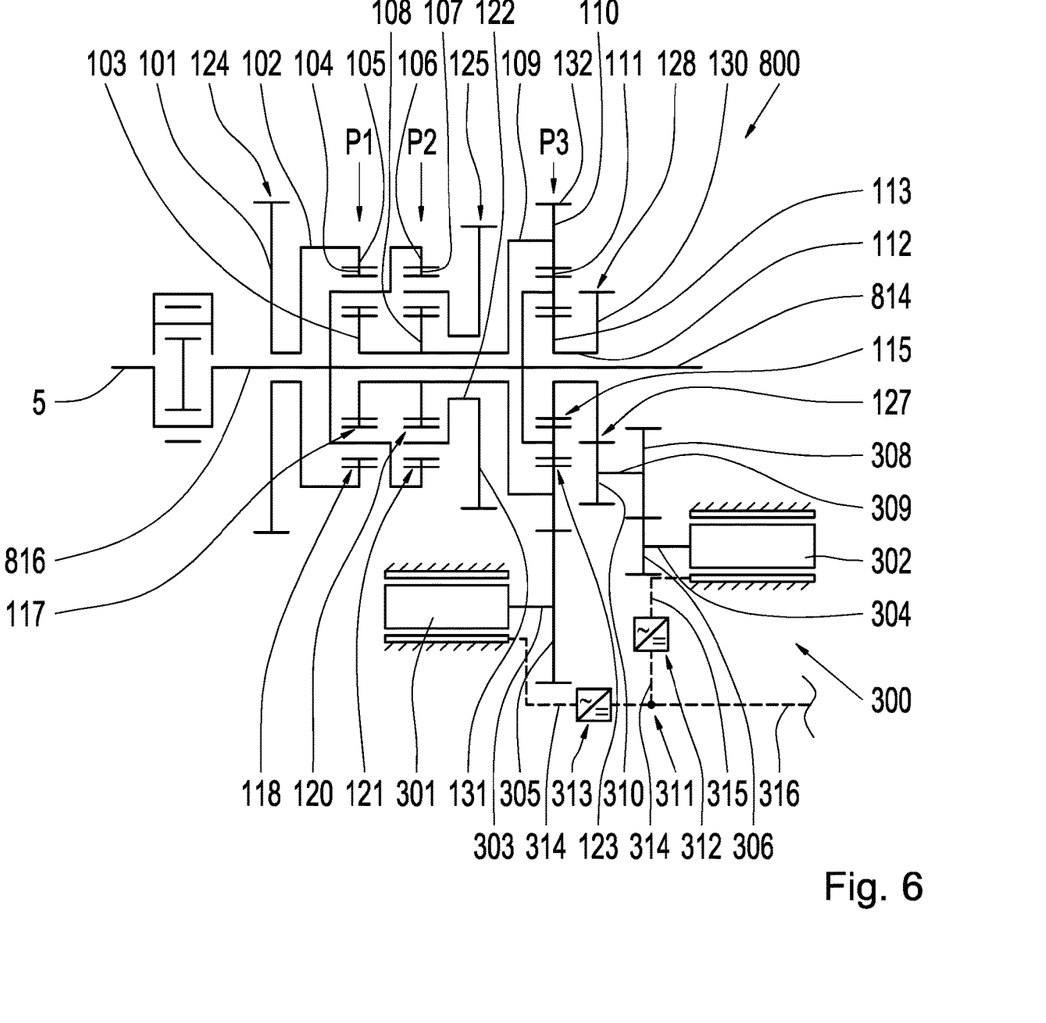
FIG. 6 shows a schematic view of a further planetary gear mechanism arrangement in combination with a reverse gear mechanism and a variator for use in a continuously variable power-split transmission according to a third and a fourth embodiment.

A modification of the arrangement shown in FIG. 1 is shown in FIG. 6. The planetary gear mechanism arrangement 800 differs from the planetary gear mechanism arrangement 100 shown in FIG. 1 in that the input shaft 816 is configured as a solid shaft. Additionally, no reverse gear mechanism is provided on the input side but the transmission input shaft is coupled to the input shaft 816. The input shaft 816 at the same time constitutes a power take-off shaft 814. A torque which may be used for driving implements or attachments is available via the power take-off shaft 814. The remaining components of the planetary gear mechanism arrangement 800 are identical to those of the above-described planetary gear mechanism arrangement 100. The variator 300 is coupled to the planetary gear mechanism arrangement 800 in the manner described with reference to FIG. 1. According to the modification, the electric machines 301 and 302 are additionally connected together via an intermediate circuit 311. Electric power for consumers is provided via the intermediate circuit 311. The intermediate circuit 311 has a line 314 connected to the first electric machine 301 and a line 315 connected to the second electric machine 302. An inverter 313, 312 is provided in each line 314, 315. The two lines 314 and 315 are connected to a line 316 from which the electric power for a consumer is able to be drawn.

Figure 7:
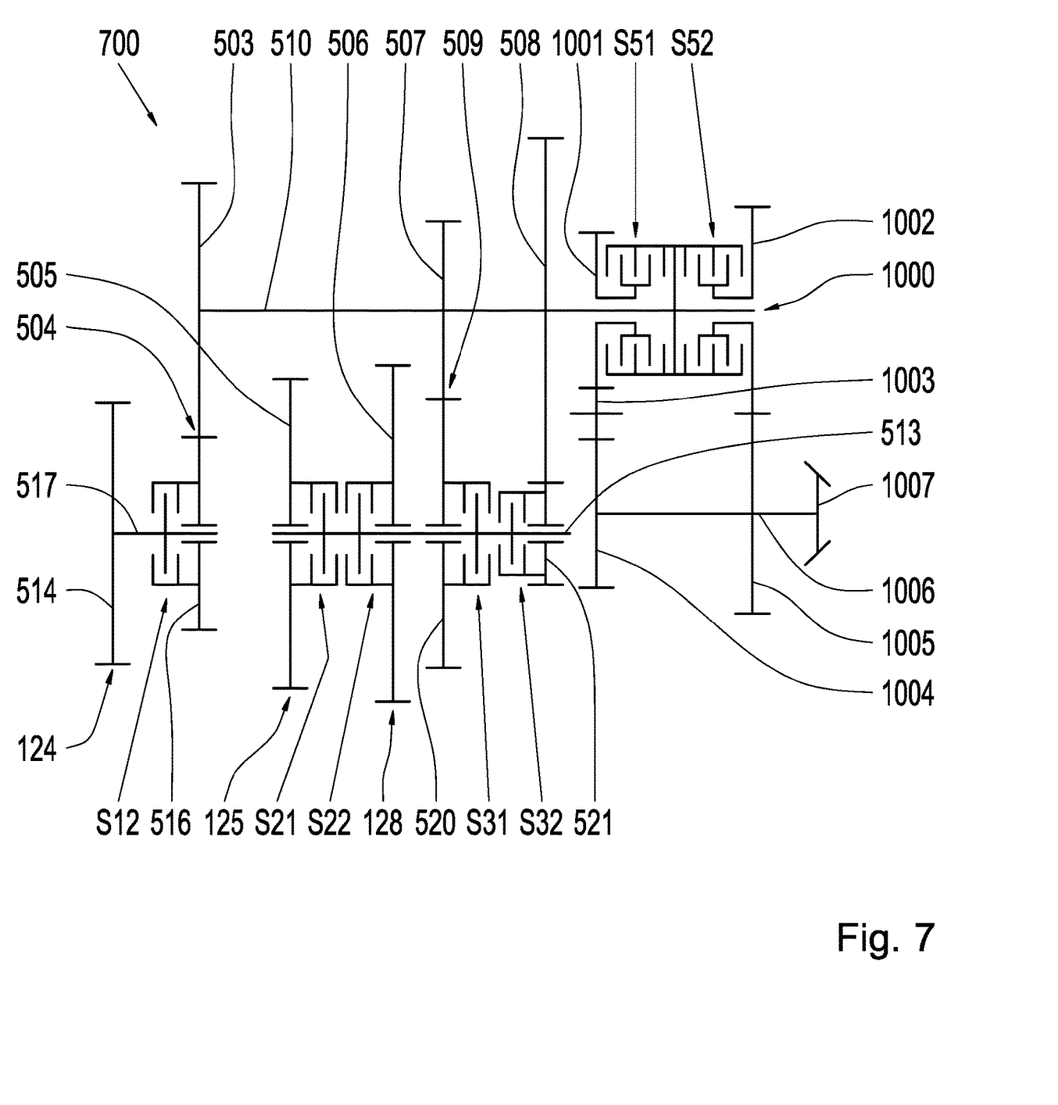
FIG. 7 shows a schematic view of a change-speed gearbox for use in a continuously variable power-split transmission according to the third embodiment.

A change-speed gearbox 700, which is able to be used with the planetary gear mechanism arrangement 800 shown in FIG. 6, is shown in FIG. 7. The change-speed gearbox 700 differs from the change-speed gearbox 600 shown in FIG. 4 in that the clutches S12, S21, S22, S31, S32 are designed as individual load shifting elements. The clutches S12, S21, S22, S31, S32 in this case are designed as multi-plate clutches. Moreover, the output shaft 510 does not form the transmission output shaft but an input shaft of a reverse gear mechanism 1000.

The reverse gear mechanism 1000 has a first idler gear 1001 and a second idler gear 1002. The first idler gear 1001 is connectable fixedly in terms of rotation to the output shaft 510 via a shifting element S51 in the form of a clutch and the second idler gear 1002 is connectable fixedly in terms of rotation to the output shaft 510 via a shifting element S52 in the form of a clutch. The first idler gear 1001 is operatively connected via a gear 1003 to a first fixed gear 1004 of a transmission output shaft 1006. The second idler gear 1002 is in engagement with a second fixed gear 1005 on the transmission output shaft 1006. An output gear 1007 is connected fixedly in terms of rotation to the transmission output shaft 1006.

Figure 8:
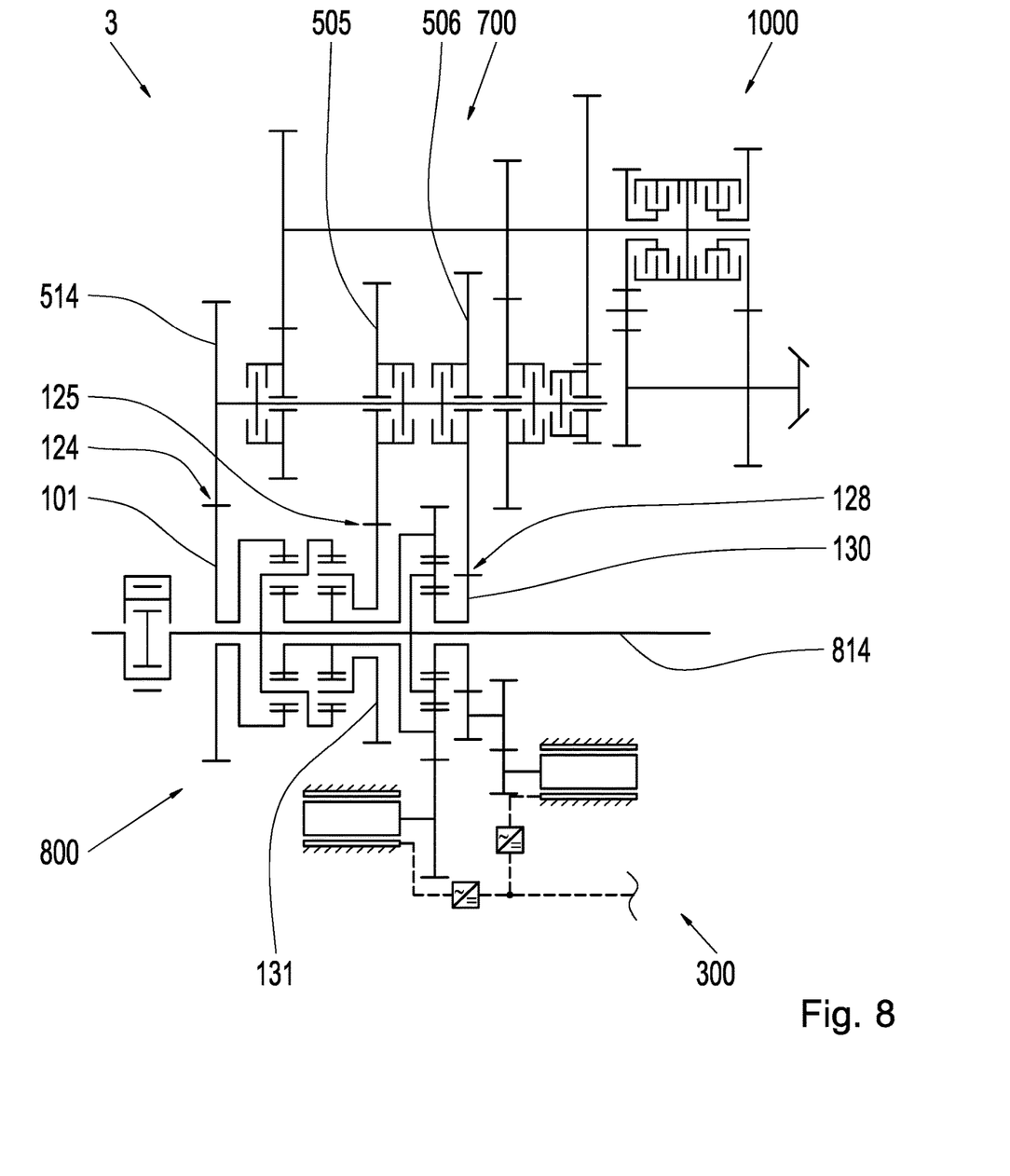
FIG. 8 shows schematically a continuously variable power-split transmission according to the third embodiment.

A combination of the change-speed gearbox 700, shown in FIG. 7, and the reverse gear mechanism 1000 with the arrangement described in FIG. 6 forms a continuously variable power-split transmission 3 according to a third embodiment and is shown in FIG. 8. The fixed gear 101 of the planetary gear mechanism arrangement 800 is in engagement with the fixed gear 514 and forms therewith the gearwheel pairing 124. The fixed gear 131 of the planetary gear mechanism arrangement 800 is in engagement with the first idler gear 505 and forms therewith the gearwheel pairing 125. The fixed gear 130 is in engagement with the second idler gear 506 and forms therewith the gearwheel pairing 128.

Figure 9:
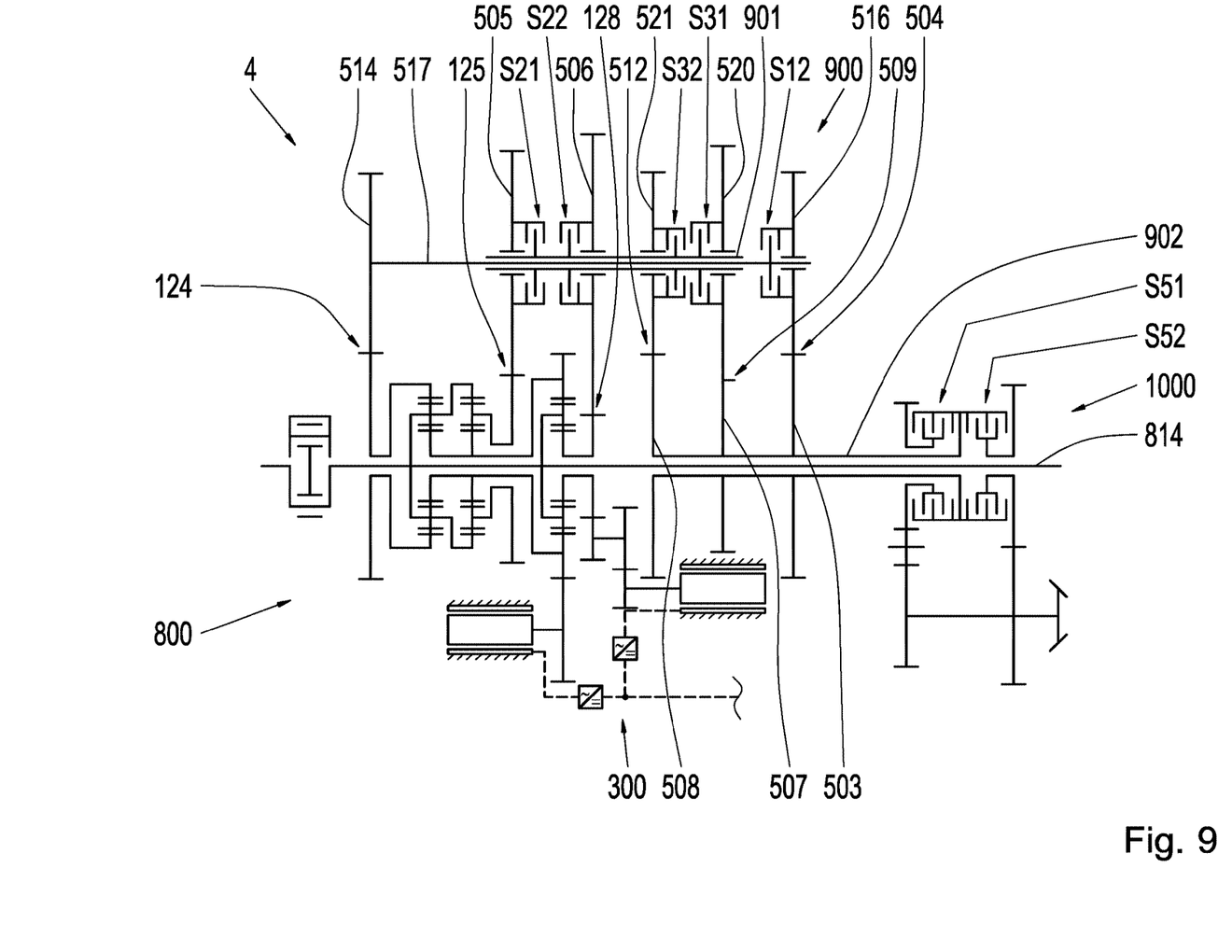
FIG. 9 shows schematically a continuously variable power-split transmission according to the fourth embodiment.

FIG. 9 shows a continuously variable power-split transmission 4 according to a fourth embodiment. The transmission 4 according to the fourth embodiment differs from the transmission 3 according to the third embodiment in that the change-speed gearbox is of nested design in order to save constructional space. According to the fourth embodiment, an output shaft 902 which corresponds in its function to the output shaft 510 is designed as a hollow shaft. The output shaft 902 is designed to be coaxial to the power take-off shaft 814. The power take-off shaft 814 extends in the longitudinal direction through the output shaft 902 and the reverse gear mechanism 1000. In order to permit this arrangement, according to the fourth embodiment the second input shaft 901, which in its function corresponds to the input shaft 513, is configured as a hollow shaft. The input shaft 517 and the input shaft 901 are coaxially arranged, wherein the input shaft 517 extends through the input shaft 901. The fixed gear 514 and the idler gear 516 are arranged in the longitudinal direction of the change-speed gearbox 900 on different sides of the input shaft 901.

All of the gears of the planetary gear mechanism arrangements, the reverse gear mechanism, the change-speed gearbox, and the gears for the transmission of power from the electric machines 301, 302 to the third planetary gear set P3 are designed as spur gears. In each case, individual modules of a drive train which may be connected in an appropriate manner are produced by the above-described configurations of the planetary gear mechanism arrangements, the reverse gear mechanism, the change-speed gearbox and the variators.

In the continuously variable power-split transmissions, a plurality of driving ranges may be set by engaging and disengaging different mechanical power paths and/or gear stages. Within these driving ranges the transmission ratio of the transmission is continuously variable by an actuation of the electric machines 301, 302.

Figure 10:
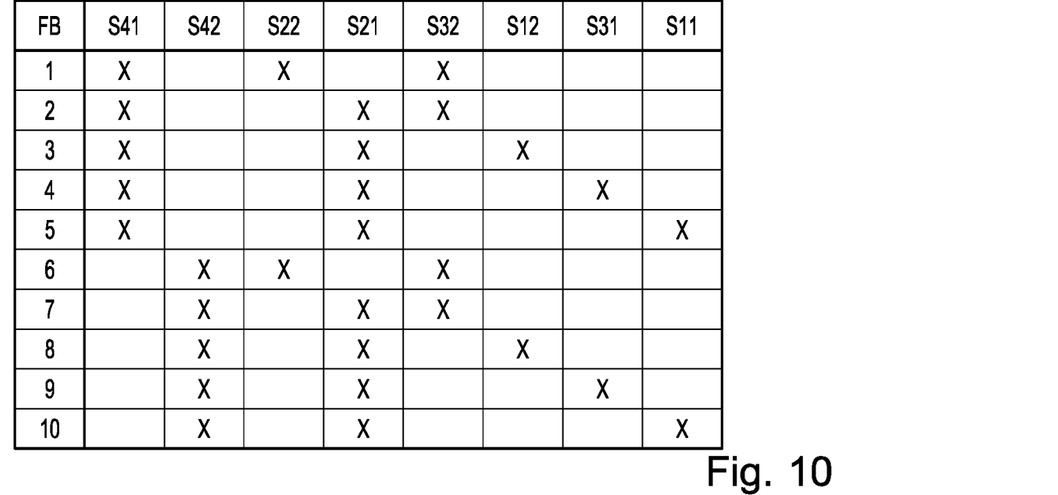
FIG. 10 shows a circuit diagram of the transmission shown in FIG. 3.

The driving ranges and power paths of the continuously variable power-split transmission 1 according to the first embodiment are shown in FIG. 10. The transmission 1 according to the first embodiment has ten driving ranges. In the first driving range FB1, the clutches S41, S22 and S32 are engaged and the brake S42 and the clutches S21, S12, S31 and S11 are disengaged. In the second driving range FB2, the clutches S41, S21, and S32 are engaged and the brake S42 and the clutches S22, S12, S31 and S11 are disengaged. In the third driving range FB3, the clutches S41, S21 and S12 are engaged and the brake S42 and the clutches S22, S32, S31 and S11 are disengaged. In the fourth driving range FB4, the clutches S41, S21 and S31 are engaged and the brake S42 and the clutches S22, S32, S12 and S11 are disengaged. In the fifth driving range FB5, the clutches S41, S21 and S11 are engaged and the brake S42 and the clutches S22, S32, S12 and S31 are disengaged. In the sixth driving range FB6, the brake S42 and the clutches S22 and S32 are engaged and the clutches S41, S21, S12 and S31 and S11 are disengaged. In the seventh driving range FB7, the brake S42 and the clutches S21 and S32 are engaged and the clutches S41, S22, S12, S31 and S11 are disengaged. In the eighth driving range FB8, the brake S42 and the clutches S21 and S12 are engaged and the clutches S41, S22, S32, S31 and S11 disengaged. In the ninth driving range FB9, the brake S42 and the clutches S21 and S31 are engaged and the clutches S41, S22, S32, S12 and S11 are disengaged. In the tenth driving range FB10, the brake S42 and the clutches S21 and S11 are engaged and the clutches S41, S22, S32, S12 and S31 are disengaged.

Figure 11:
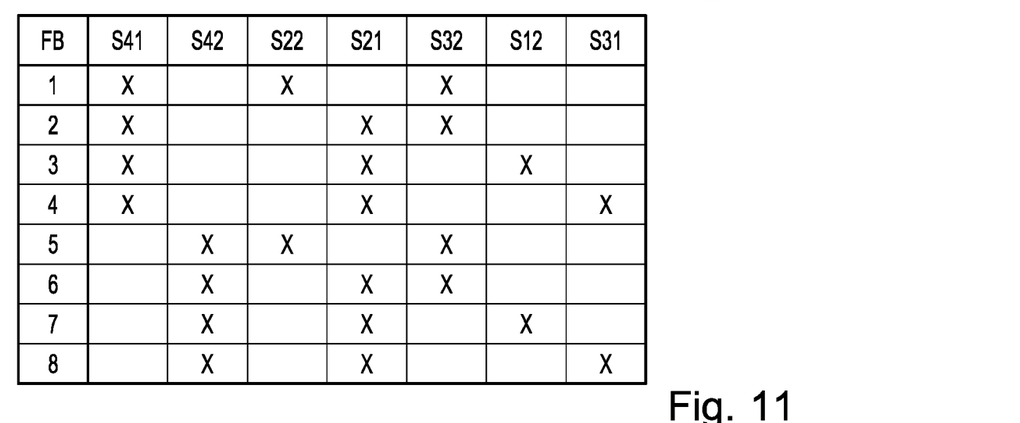
FIG. 11 shows a circuit diagram of the transmission shown in FIG. 5.

The driving ranges and power paths of the continuously variable power-split transmission 2 according to the second embodiment are shown in FIG. 11. The transmission 2 has eight driving ranges FB1 to FB8. The driving ranges correspond to the driving ranges of the transmission 1 according to the first embodiment, with the difference that an actuation of the clutch S11 is omitted. Thus the driving ranges FB5 and FB10 in FIG. 10 are omitted. The remaining shifting operations of the clutches and the brake are identical and form the driving ranges FB1 to FB8. These driving ranges correspond in FIG. 10 to the driving ranges FB1 to FB4 and FB6 to FB9 without the actuation of the clutch S11.

Figure 12:
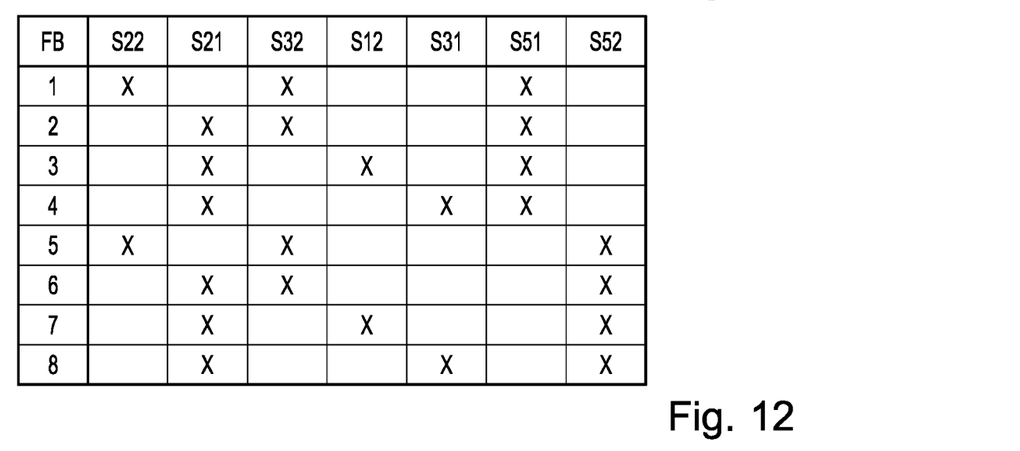
FIG. 12 shows a circuit diagram of the transmissions shown in FIGS. 7 and 8.

The driving ranges and power paths of the continuously variable power-split transmission 3 according to the third embodiment and the continuously variable power-split transmission 4 according to the fourth embodiment are shown in FIG. 12. The transmissions 3 and 4 have eight driving ranges FB1 to FB8. The shifting operations of the clutches S22, S21, S32, S12 and S31 correspond to those of the driving ranges FB1 to FB8 in FIG. 11. The clutches S41 and S42 in FIG. 11 have been replaced by the clutches S51 and/or S52 and are shifted according to the clutches S41 and S42.

LIST OF REFERENCE NUMERALS

1 Transmission
2 Transmission
3 Transmission
4 Transmission
5 Transmission input shaft
6 Transmission output shaft
61 Output gear
100 Planetary gear mechanism arrangement
101 Fixed gear
102 Output shaft
103 Sun gear
104 Planetary arrangement
105 Ring gear
106 Ring gear
107 Planetary arrangement
108 Sun gear
109 Connecting shaft
110 Ring gear
111 Planetary arrangement
112 Output shaft
113 Sun gear
114 Power take-off shaft
115 Gearwheel pairing
116 Input shaft/hollow shaft
117 Gearwheel pairing
118 Gearwheel pairing
120 Gearwheel pairing
121 Gearwheel pairing
122 Output shaft
123 Gearwheel pairing
124 Gearwheel pairing
125 Gearwheel pairing
126 Gearwheel pairing
127 Gearwheel pairing
128 Gearwheel pairing
130 Fixed gear
131 Fixed gear
132 External toothing
200 Planetary gear mechanism arrangement
300 Variator
301 Energy converter/electric machine
302 Energy converter/electric machine
303 Output shaft
304 Output shaft
305 Fixed gear
306 Fixed gear
308 Fixed gear
309 Shaft
310 Fixed gear
311 Intermediate circuit
312 Inverter
313 Inverter
314 Line
400 Reverse gear mechanism
401 Sun gear
402 Planetary arrangement
403 Ring gear
406 Input shaft
500 Change-speed gearbox
501 Gearwheel pairing
502 Fixed gear
503 Fixed gear
504 Gearwheel pairing
505 Idler gear
506 Idler gear
507 Fixed gear
508 Fixed gear
509 Gearwheel pairing
510 Output shaft
512 Gearwheel pairing
513 Input shaft
514 Fixed gear
515 Idler gear
516 Idler gear
517 Input shaft
520 Idler gear
521 Idler gear
522 Idler gear
600 Change-speed gearbox
700 Change-speed gearbox
800 Planetary gear mechanism arrangement
814 Power take-off shaft
816 Input shaft
900 Change-speed gearbox
901 Input shaft
902 Output shaft
1000 Reverse gear mechanism
1001 Idler gear
1002 Idler gear
1003 Gear
1004 Fixed gear
1005 Fixed gear
1006 Transmission output shaft
1007 Output gear
FB1 . . . 10 Driving range
P1 Planetary gear set
P2 Planetary gear set
P3 Planetary gear set
S1 Shifting element
S11 Clutch
S12 Clutch
S2 Shifting element
S21 Clutch
S22 Clutch
S3 Shifting element
S31 Clutch
S32 Clutch
S41 Shifting element/clutch
S42 Shifting element/brake
S51 Shifting element/clutch
S52 Shifting element/clutch

The invention claimed is:

1. A continuously variable power-split transmission comprising a planetary gear mechanism arrangement having first, second and third planetary gear sets, an input shaft and first second and third output shafts, a change-speed gearbox which is connected to the first, the second and the third output shafts,
a reverse gear mechanism, and
a variator,
each of the first, the second and the third planetary gear sets being assigned, in each case, one of the first, the second and the third output shafts and the input shaft being operatively connected in each of the first, the second and the third planetary gear sets via, in each case, one gearwheel pairing to, in each case, one of the first, the second and the third output shafts,
the transmission being shiftable, by the change-speed gearbox and the reverse gear mechanism, into at least eight driving ranges, and
the variator is set up to vary a transmission ratio of the transmission within the at least eight driving ranges, in each case, in a continuously variable manner and the variator being continuously operatively connected to a single planetary gear set of the first, the second and the third planetary gear sets.

2. The continuously variable power-split transmission according to claim 1, wherein the variator has two energy converters which are connected together and which, in each case, have one output shaft, which are continuously connected to the single planetary gear set via one or more spur gear stages.

3. The continuously variable power-split transmission according to claim 2, wherein the two energy converters are electric machines with a power electronics unit.

4. The continuously variable power-split transmission according to claim 2, wherein the two energy converters provide electric power, via an intermediate circuit, for a consumer.

5. The continuously variable power-split transmission according to claim 1, wherein in the first planetary gear set, the input shaft is connected to a first planetary arrangement, the first output shaft is connected to a first ring gear, and a connecting shaft is connected to a first sun gear;
in the second planetary gear set, the input shaft is connected to a second ring gear, the second output shaft is connected to a second planetary arrangement and the connecting shaft is connected to a second sun gear, and
in the third planetary gear set, the input shaft is connected to a third planetary arrangement, the connecting shaft is connected to a third ring gear and the third output shaft is connected to a third sun gear.

6. The continuously variable power-split transmission according to claim 5, wherein at least one of:
the third ring gear and the third output shaft are continuously operatively connected to the variator, and
the first, the second and the third planetary gear sets are arranged, in an input shaft direction, in a sequence of the first planetary gear set, the second planetary gear set and the third planetary gear set.

7. The continuously variable power-split transmission according to claim 6, wherein the third ring gear is in engagement with a fixed gear on an output shaft of a first energy converter of the variator, via an external toothing provided on the third ring gear, and the third output shaft is operatively connected to an output shaft of a second energy converter of the variator via two spur gear stages.

8. The continuously variable power-split transmission according to claim 1, wherein the first, the second and the third planetary gear sets have identical gear ratios.

9. The continuously variable power-split transmission according to claim 1, wherein the change-speed gearbox is a spur gear mechanism which, for producing the at least eight driving ranges (FB1 to FB10), is able to bring three gears, which are continuously operatively connected to the first, the second and the third output shafts of the planetary gear mechanism arrangement, selectively into an operative connection with an output shaft of the change-speed gearbox via gearwheel pairings which may be engaged and disengaged.

10. The continuously variable power-split transmission according to claim 9, wherein the change-speed gearbox has a first input shaft with a fixed gear and an idler gear which is fixedly connectable, in terms of rotation, to the first input shaft of the change-speed gearbox via a shifting element, a second input shaft of the change-speed gearbox which is coaxial to the first input shaft of the change-speed gearbox with four idler gears which are fixedly connectable, in terms of rotation, to the second input shaft of the change-speed gearbox via shifting elements, and the output shaft of the change-speed gearbox has three fixed gears, one of the three fixed gears are in engagement with the idler gear of the first input shaft and two of the three fixed gears are in engagement with idler gears of the second input shaft.

11. The continuously variable power-split transmission according to claim 10, wherein a first idler gear of the four idler gears of the second input shaft is in engagement with a fixed gear of the second output shaft and a second idler gear of the second input shaft is in engagement with a fixed gear of the third output shaft.

12. The continuously variable power-split transmission according to claim 10, wherein the first input shaft of the change-speed gearbox has a further idler gear which is fixedly connectable, in terms of rotation, to the first input shaft of the change-speed gearbox via a shifting element, and the output shaft of the change-speed gearbox has a further fixed gear which is in engagement with the idler gear of the first input shaft of the change-speed gearbox.

13. The continuously variable power-split transmission according to claim 9, wherein the output shaft of the change-speed gearbox is a hollow shaft which is coaxial to the input shaft of the planetary gear mechanism arrangement.

14. The continuously variable power-split transmission (1; 2; 3; 4) according to claim 1, wherein for implementing different rotational directions of the transmission output shaft, the input shaft of the planetary gear mechanism arrangement is operatively connectable with the transmission input shaft via the reverse gear mechanism, or
for implementing different rotational directions of the transmission output shaft, the output shaft of the change-speed gearbox may be brought into an operative connection with the transmission output shaft via a reverse gear mechanism.

15. The continuously variable power-split transmission according to claim 1, wherein a power take-off shaft which is fixedly connected, in terms of rotation, to the transmission input shaft, and at least one of:
the transmission input shaft is arranged coaxially to the power take-off shaft, and/or
the transmission output shaft is arranged offset in parallel to the transmission input shaft and the input shaft of the planetary gear mechanism.

16. A continuously variable power-split transmission comprising:
a planetary gear mechanism arrangement having first, second and third planetary gear sets, an input shaft and first second and third output shafts;

a change-speed gearbox which is connected to the first, the second and the third output shafts of the planetary gear mechanism arrangement;
a reverse gear mechanism; and
a variator;
the first planetary gear set being assigned to the first output shaft, the second planetary gear set being assigned to the second output shaft, and the third planetary gear set being assigned to the third output shaft, and the input shaft of the planetary gear mechanism arrangement being operatively connected, via a gearwheel pairing of the first planetary gearset, to the first output shaft, and being operatively connected, via a gearwheel pairing of the second planetary gearset, to the second output shaft, and being operatively connected, via a gearwheel pairing of the third planetary gearset, to the third output shaft;
the continuously variable power-split transmission being shiftable into at least eight driving ranges via the change-speed gearbox and the reverse gear mechanism; and
the variator being continuously operatively connected to only the third planetary gear set and being set up to vary a transmission ratio of the continuously variable power-split transmission within the respective at least eight driving ranges in a continuously variable manner.

* * * * *